Oct. 26, 1965   L. J. COCK   3,214,673
PRODUCTION AND STABILIZATION OF LOW DIRECT VOLTAGE
Filed March 31, 1961

INVENTOR
LUDOLF J. COCK.
BY
AGENT

United States Patent Office 3,214,673
Patented Oct. 26, 1965

3,214,673
PRODUCTION AND STABILIZATION OF LOW
DIRECT VOLTAGE
Ludolf Jentje Cock, Emmasingel, Eindhoven, Netherlands, assignor to North American Philips Company, Inc., New York, N.Y., a corporation of Delaware
Filed Mar. 31, 1961, Ser. No. 99,887
Claims priority, application Germany, May 4, 1960, N 18,283
3 Claims. (Cl. 321—18)

The invention relates to a supply circuit arrangement, particularly for very small-powered apparatus, for example for transistorized devices, in which use is made of a fullwave rectifier and a smoothing capacitor. In known apparatus of this kind the alternating supply voltage of, for example, 220 v. or 110 v. is converted by a transformer into a lower voltage and then rectified.

It is a primary object of the invention to avoid the use of a transformer in low voltage supplies. To this end a resistor could be connected between the alternating supply and the rectifier, the voltage occurring at the rectifier thus being reduced. However, this resistor materially reduces the useful effect of the arrangement. As an alternative, a capacitor or, in general, a reactive impedance could be connected in series between the supply source and the rectifier. However, if the load impedance to be connected to the rectifier has too high a value, this reactive impedance will then be traversed by a current so low in value that a high voltage will be produced across the smoothing capacitor and the rectifier will then very likely be destroyed due to the voltage rating being exceeded.

The invention obviates this risk and permits at the same time the attainment of a stabilization of the voltage produced across the load impedance. The invention is characterized in that the supply voltage is fed via a reactive impedance, preferably a second capacitor which is small with respect to the smoothing capacitor, to the fullwave rectifier and in that in parallel with the smoothing capacitor, there is connected a voltage-dependent resistor which limits the voltage across the smoothing capacitor to a low value as compared with the supply voltage.

The invention will now be described more fully with reference to the drawing.

Figure 1:
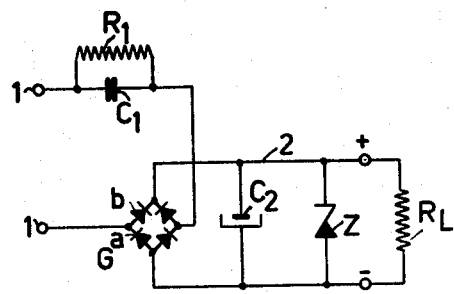
FIG. 1 is a schematic diagram of one embodiment for a low output power.

Referring to FIG. 1, the supply voltage from the terminals 1 is fed via a series capacitor $C_1$ to the fullwave rectifier G. The drawing shows four rectifiers, but two rectifiers might also be sufficient, for example, when the rectifier $a$ is replaced by a short-circuit connection and the rectifier $b$ is omitted. Since the rectifier G rectifies both the positive phase and the negative phase of the supply voltage, a direct voltage is produced across the capacitor $C_2$ and at the same time rectification phenomena at the capacitor $C_1$ are avoided.

In parallel with the capacitor $C_2$ are connected the Zener diode Z and the load impedance $R_L$. The Zener diode serves as a voltage-dependent resistor and limits the voltage produced across the capacitor $C_2$ to a value which is low as compared with the supply voltage.

In this manner various advantages are obtained:

(a) Owing to the great difference between the values of the supply voltage and the Zener voltage the rectifiers G remain alternately conductive during the major part of the oscillatory period of the supply voltage, so that the hum voltage produced across the capacitor $C_2$ remains comparatively low.

(b) The maximum voltage produced across the rectifiers G is equal to the Zener voltage of the diode Z; if this were not true, the voltage across the rectifiers could increase to double the peak voltage value of the supply voltage. The rectifiers G may therefore be proportioned for very low reverse voltages, so that they are comparatively cheap.

(c) The voltage across the load impedance $R_L$ is stabilized on a substantially constant value—

In a practical embodiment the capacitors $C_1$ and $C_2$ had a value of 0.47 µf. and 250 µf. respectively, the supply mains voltage amounted to 220 v. and the Zener voltage of the diode Z was 6 v. The rectifiers G were selenium rectifiers having a maximum permissible reverse voltage of 30 v. The capacitor $C_1$ was shunted by a resistor $R_1$ of 0.47M ohm in order to remove the charge prevailing at this capacitor when switching off. In order to improve smoothing of the produced voltage a further resistor of, for example, 15 ohm, may be included in the conductor 2 between the capacitor $C_2$ and the diode Z. The current available for the load impedance $R_L$ was between 0 and 30 ma.

Figure 2:
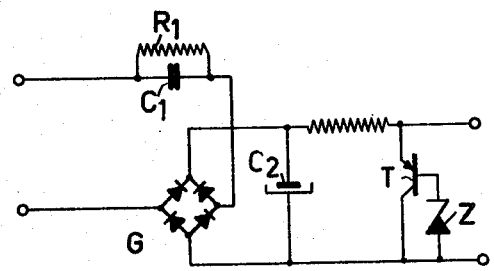
FIG. 2 is a schematic diagram of another embodiment for a slightly higher output power.

In FIG. 2 the Zener diode Z is replaced by a transistor T between the base and the collector of which is included a Zener diode in known manner. Through the transistor T there can flow higher currents than through the Zener diode, so that the arrangement is generally suitable for a maximum load current of 60 ma.

Figure 3:
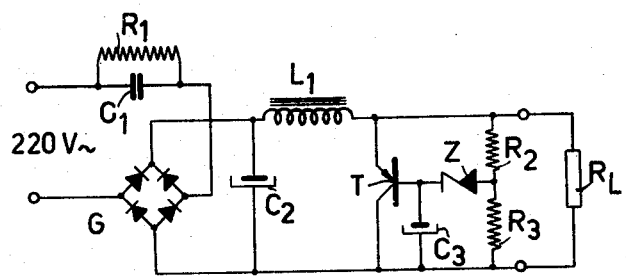
FIG. 3 is a schematic diagram of a third embodiment for a still higher output power.

The arrangement shown in FIG. 3 permits the production across the load impedance $R_L$ of a voltage exceeding the Zener voltage of the diode Z. The Zener diode Z is included between the base of the transistor T and a tapping of voltage divider $R_2$-$R_3$, connected in parallel with the load impedance $R_1$. In order to improve smoothing, a capacitor $C_3$ is connected between the base electrode and the collector electrode of the transistor T. In a practical embodiment the arrangement was proportioned as follows for an output voltage of 12 v. and an output current from 0 to 1 a.:

$C_1$=16 µf., maximum permissible voltage 220 v. (alternating voltage), $C_2$=1600 µf., maximum permissible voltage 12.5 v. (direct voltage), $C_3$=250 µf., maximum permissible voltage 12.5 v. (direct voltage), $R_1$=47K ohms, $R_2$=68 ohms, $R_3$=33 ohms, $L_1$=20 mh., Z=OAZ 204, T=OC 27, G=B 30C1000 (maximum permissible reverse voltage 30 v.)

Instead of using the capacitor $C_1$, use may be made of an inductive impedance, for example the motor winding of a record player or of a tape recorder. The arrangement may be incorporated in a simple manner in a plug, of which the contacts are connected to the terminals (1—1), whilst a conductor connected to the plug may connect the output terminals of the arrangement to the load impedance $R_L$.

Owing to the low losses in the above arrangements, any serious heating problems are avoided.

It is to be noted that the quantitative values given above are for illustrative purposes only, to enable ready practice of the invention; the inventive concept of the invention is not limited to these values, the scope thereof being set forth in the appended claims.

What is claimed is:

1. A transformerless power supply for supplying and stabilizing a low direct voltage comprising: a source of alternating voltage, said source being coupled to the input of a fullwave rectifier through a reactive impedance having a relatively high value, the output of said rectifier being coupled to a load impedance, a smoothing capacitor having a relatively low reactive impedance connected in parallel with said load impedance and said rectifier, a voltage divider connected across said load impedance, a transistor having emitter, collector and base electrodes, the emitter-collector path of said transistor being connected in parallel with said load impedance, and a Zener diode having one end connected to said base electrode and another end connected to a tap of said voltage divider for stabilizing the voltage across said load impedance at a low value compared to that of said source of alternating voltage.

2. A transformerless power supply for supplying and stabilizing a low direct voltage, comprising: a source of alternating voltage, said source being coupled to the input of a full-wave rectifier through a reactive impedance having a relatively high value, the output of said rectifier being coupled to a load impedance, a first smoothing capacitor having a relatively low reactive impedance connected in parallel with said load impedance and said rectifier, a voltage divider connected across said load impedance, a transistor having emitter, collector and base electrodes, the emitter-collector path of said transistor being connected in parallel with said load impedance, a second smoothing capacitor connected across said base and collector electrodes, and a Zener diode having one end connected to said base electrode and another end connected to a tap of said voltage divider for stabilizing the voltage across said load impedance at a lower value compared to that of said source of alternating voltage.

3. A transformerless power supply for supplying and stabilizing a low direct voltage, comprising: a source of alternating voltage, said source being coupled to the input of a full-wave rectifier through a capacitor having a reactive impedance of relatively high value, the output of said rectifier being coupled to a load impedance, a first smoothing capacitor having a relatively low reactive impedance connected in parallel with said load impedance and said rectifier, a voltage divider connected across said load impedance, a transistor having emitter, collector and base electrodes, the emitter-collector path of said transistor being connected in parallel with said load impedance, a second smoothing capacitor connected across said base and collector electrodes, and a Zener diode having one end connected to said base electrode and another end connected to a tap of said voltage divider for stabilizing the voltage across said load impedance at a lower value compared to that of said source of alternating voltage.

References Cited by the Examiner
UNITED STATES PATENTS

| | | | |
|---|---|---|---|
| 1,829,254 | 10/31 | Asch | 323—79 |
| 2,734,162 | 2/56 | Blanke | 321—16 |
| 2,751,550 | 6/56 | Chase | 307—88.5 |
| 2,881,382 | 4/59 | Amato | 321—8 |
| 2,983,862 | 5/61 | Montner et al. | 321—16 X |
| 3,001,120 | 9/61 | Bereskin | 321—8 |
| 3,046,466 | 7/62 | Tyrrell et al. | 321—16 |

LLOYD McCOLLUM, *Primary Examiner.*

RALPH D. BLAKESLEE, *Examiner.*